(12) United States Patent
Greenwalt

(10) Patent No.: US 6,355,088 B1
(45) Date of Patent: *Mar. 12, 2002

(54) METHOD FOR DIRECT REDUCTION AND UPGRADING OF FINE-GRAINED REFRACTORY AND EARTHY IRON ORES AND SLAGS

(75) Inventor: Richard B. Greenwalt, Danville, CA (US)

(73) Assignee: Bechtel Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,904

(22) Filed: Oct. 14, 1999

Related U.S. Application Data

(63) Continuation-in-part of application No. 09/056,183, filed on Apr. 6, 1998.
(60) Provisional application No. 60/055,308, filed on Aug. 4, 1997.

(51) Int. Cl.[7] .............................................. C21B 13/00
(52) U.S. Cl. .............................. 75/436; 75/503; 75/505
(58) Field of Search ........................... 75/436, 503, 505

(56) References Cited

U.S. PATENT DOCUMENTS

| | | |
|---|---|---|
| 2,287,663 A | 6/1942 | Brassert |
| 2,765,988 A | 10/1956 | Möklebust et al. |
| 2,944,884 A | 7/1960 | Halvorson |
| 2,986,460 A | 5/1961 | Babcock et al. |
| 3,103,315 A | 9/1963 | Gerlach |
| 3,740,215 A | 6/1973 | Burk et al. |
| 4,244,732 A | 1/1981 | Brauns |
| 4,416,688 A | 11/1983 | Greenwalt |
| 4,449,671 A | 5/1984 | Martinez-Vera et al. |
| 4,615,712 A | 10/1986 | Wen |
| 4,691,868 A | 9/1987 | Whitten, Jr. et al. |
| 4,851,038 A | 7/1989 | Sakamoto et al. |
| 4,917,723 A | 4/1990 | Coyne, Jr. |
| 5,698,007 A | 12/1997 | Schmitt |
| 5,849,063 A | 12/1998 | Myerson et al. |
| 6,048,382 A * | 4/2000 | Greenwalt .................. 75/436 |

FOREIGN PATENT DOCUMENTS

| | | |
|---|---|---|
| DE | 1 806 6411 0 | 8/1969 |
| EP | 207 779 | 1/1987 |
| FR | 582 159 | 9/1969 |
| GB | 702314 | 1/1954 |

* cited by examiner

*Primary Examiner*—Melvyn Andrews
(74) *Attorney, Agent, or Firm*—Townsend and Townsend and Crew LLP

(57) ABSTRACT

A method of upgrading relatively rich, fine-grained earthy hematite iron ores is provided. The iron ore, after suitable preparation, is reduced using a solid state reduction technique. As a result of the reduction process, the iron grains undergo size enhancement while the nonmetallic oxides are unreduced and remain as refractory oxide gangue. After completion of the reduction process, the enlarged malleable metallic iron grains are crushed in such a way as to cause the iron grains to fuse together, forming large, flat iron flakes. In order to achieve maximum flake size, the crushing system applies a relatively gradual pressing force rather than a rapid, impact type of force. As the large flakes are formed, the iron grains are liberated from the refractory oxide grains resulting in an increase in density. The crushing system causes non-iron oxide bonds to be broken, resulting in the formation of residual refractory particles generally with a grain size of less than 0.05 millimeters. The shape, size, density, and ferromagnetic differences between the iron flakes and the nonmetallic oxides are used to separate the iron from the nonmetallics. A variety of different separation techniques may be used, including screens, jigs, spirals, elutriation, cyclones, magnetic, and gravity separation. The combination of solid state reduction, mechanical working, and physical/electromagnetic separation enable consistent production of super concentrates of material with metallic iron contents exceeding 92% with less than 4% oxide gangue and an iron recovery of greater than 95%.

37 Claims, 3 Drawing Sheets

METHOD FOR DIRECT REDUCTION AND UPGRADING OF FINE-GRAINED REFRACTORY AND EARTHY IRON ORES AND SLAGS

CROSS-REFERENCES TO RELATED APPLICATIONS

This application is a continuation-in-part of U.S. patent application Ser. No. 09/056,183, filed Apr. 6, 1998 which is a continuation of provisional application No. 60/055,308, filed Aug. 4, 1997 which are incorporated by reference herein for all purposes.

BACKGROUND OF THE INVENTION

The present invention relates generally to a method of concentrating iron ore and, more particularly, to a method of upgrading fine-grained earthy hematite iron ores.

In recent years, the percentage of steel being produced throughout the world using electric arc furnaces has increased to approximately 30%. However, unlike some other steel manufacturing systems, electric arc furnaces require relatively high grade ore in which the total iron concentration is greater than 68% with an oxide gangue concentration of less than 3%. Materials with oxide gangue concentrations much beyond this level produce an excessive volume of slag and therefore are uneconomically feasible as charge material.

Numerous relatively high-grade iron ores with iron concentrations in the range of 60 to 65% are of an earthy nature. These ores, which proliferate in Western Australia, the Middle East, and Africa, are typically intimately associated with extremely fine grained silica and alumina of feldspathic origin. Unfortunately, due to the fine grain structure associated with these ores, liberating the iron and achieving the oxide contaminant levels required for electric arc furnace charge material is nearly impossible and is generally cost prohibitive.

Several different processes have been developed for recovering iron concentrates from ore. U.S. Pat. No. 2,944,884 discloses a technique for producing high iron concentrates from low grade ores such as taconite. In the disclosed technique, the low grade ore is first crushed to minus ⅜ inch or finer. The crushed ore is then mixed with a reactive form of carbon such that the mixture contains at least 50% more carbon than the theoretical quantity needed for complete reduction. The mixture is then heated for a period of time between 18 and 21 hours at a temperature of about 870 to 1100° C. so that the iron becomes fully reduced and carburized. The material is rapidly cooled so that the iron carbide particles lose their malleability. The charge is then ground and the carburized iron particles containing at least about 0.65% carbon are magnetically separated from the gangue particles.

U.S. Pat. No. 2,986,460 discloses a direct reduction process in which the iron ore is mixed with a carbonaceous reducing agent and then heated in a rotary kiln at temperatures of about 900° C. The material is then cooled under controlled conditions in a non-oxidizing environment. The reduced iron is then separated from most of the gangue and compacted into briquettes.

In a more recent advance, U.S. Pat. No. 4,416,688 discloses a technique for reducing high phosphorus iron ore. In the disclosed technique sponge iron produced by selective solid state reduction is ground using a ball mill. The hammering action of the ball mill causes the formation of iron flakes of approximately 0.01 to 0.1 millimeters in size along with finely divided oxide gangue. Conventional concentration techniques are used to obtain iron flake powder concentrate. The carbon content of the sponge iron must be kept to a minimum, preferably below 0.10% and at least below 0.25%. Besides placing restrictions on the carbon content, the ability of the disclosed process to obtain high iron concentrates with low oxide contents is hampered by the size of the iron flakes formed by the ball mill. As a result, the efficiency and therefore the cost effectiveness of this approach is lower than desirable.

Therefore a cost effective technique for obtaining super concentrate materials with high iron concentrations and low oxide concentrations from relatively rich, fine-grained iron ores is needed.

SUMMARY OF THE INVENTION

The present invention provides a method of upgrading relatively rich, fine-grained earthy hematite iron ores. The iron ore, after suitable preparation, is reduced using any of a variety of direct reduction techniques. For example, the ore may be subjected to a high temperature reduction utilizing hydrogen as the reductant gas. As a result of the reduction process, the iron grains undergo size enhancement. Under the same conditions the contaminant oxides of silica, alumina, apatite, lime, and magnesia are calcined, but unreduced, and remain as refractory oxide gangue.

After completion of the reduction process, the enlarged malleable metallic iron grains are crushed in such a way as to cause the iron grains to fuse together, forming large, flat iron flakes. In order to achieve maximum flake size, the crushing system applies a relatively gradual pressing force rather than a rapid, impact type of force. In one embodiment of the invention, a roll crusher is used to create flakes greater than 1.0 millimeter in size, and typically in the range of 3.0 to 5.0 millimeters in size. As the large flakes are formed, the iron grains are liberated from the refractory oxide grains resulting in an increase in density from about 4 to 5 grams per cubic centimeter to about 6 to 7 grams per cubic centimeter. At the same time that the mechanical working of the reduced iron by the crushing means causes the fusion of the iron grains into flat flakes, the fineness of the residual oxide grains increases.

The shape, size, density, and ferromagnetic differences between the iron flakes and the nonmetallic oxides facilitate separation of the iron. A variety of different separation techniques may be used, including screens, jigs, spirals, elutriation, cyclones, magnetic, and gravity separation. Final concentration and cleaning can be accomplished by low-intensity magnetic separation of the ferromagnetic metal flakes from the nonmagnetic residual oxides.

In one embodiment of the invention, the crushed, reduced material is separated using a mesh screen. The large particles, preferably those particles having a size greater than 3.0 millimeters, undergo flash grinding to further liberate the iron from the nonmetallic oxides. The small particles, those passing through the screen, undergo a longer period of grinding, in the range of 20 to 90 minutes. The iron concentrate is separated from the oxides using a low intensity magnetic separator.

The combination of solid state reduction, mechanical working, and physical/electromagnetic separation enable consistent production of super concentrates of material with metallic iron contents exceeding 92% with less than 5% oxide gangue and an iron recovery of greater than 95%. If optimized, this method can achieve an iron content of between 94% and 98% with less than 2% oxide gangue.

A further understanding of the nature and advantages of the present invention may be realized by reference to the remaining portions of the specification and the drawings.

DESCRIPTION OF THE SPECIFIC EMBODIMENTS

Figure 1:
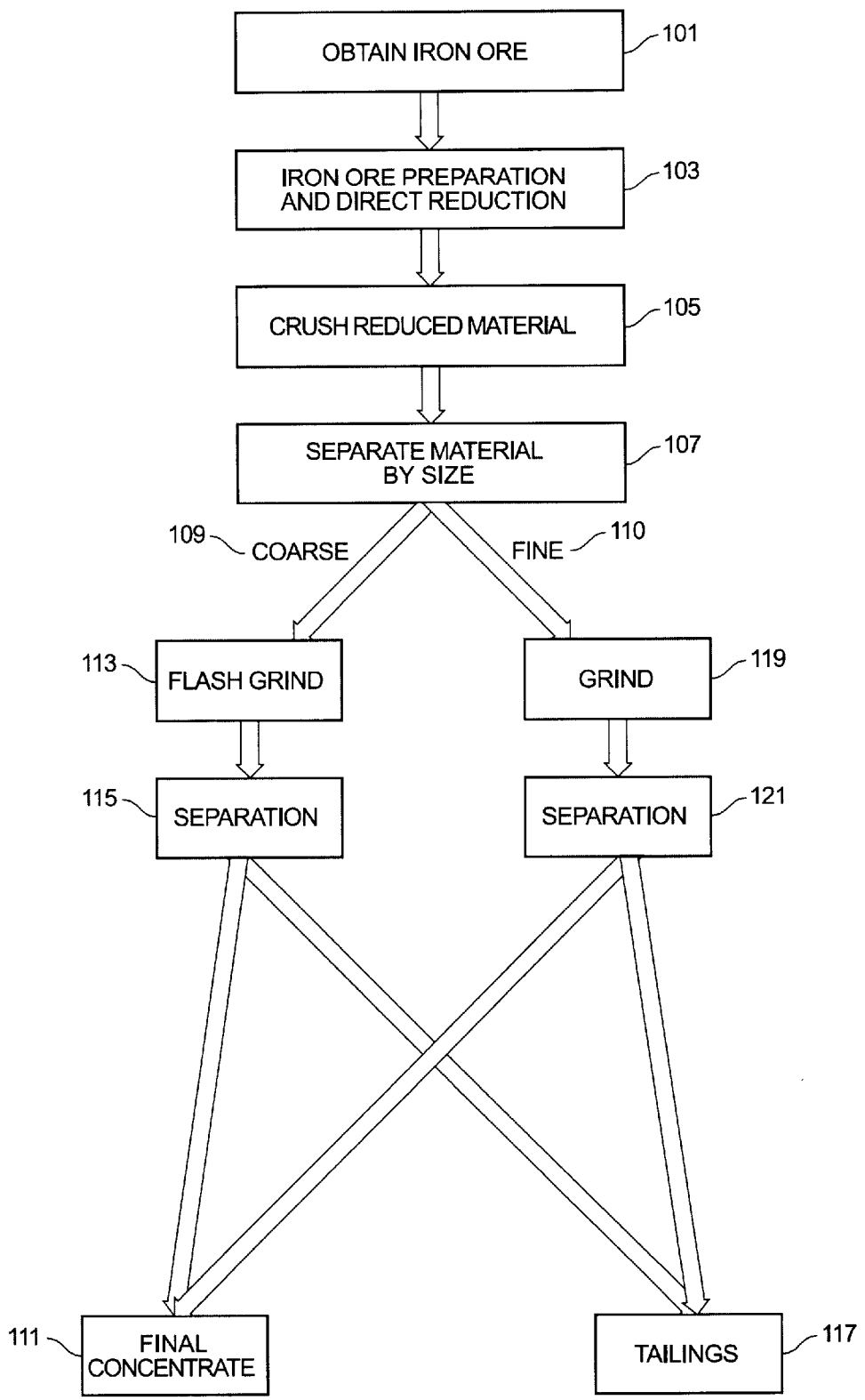
FIG. 1 is a flow diagram illustrating the principal steps associated with the present invention.

FIG. 1 is a flow diagram illustrating the present invention. After the iron ore is obtained (step 101), it undergoes direct reduction (step 103). As discussed below in further detail, a variety of different direct or solid state reduction processes may be used with the present invention, each process placing specific constraints (e.g., size) on the material to be reduced. The principal criterion in selected a direct reduction process is the associated costs. The costs are primarily due to the costs of fuel for the reduction process (e.g., hydrogen versus coal), the efficiency of the selected process, and the amount of ore preparation necessary prior to reduction.

After the ore has been reduced, it is mechanically worked with a crusher in order to fuse the iron grains together to form metal flakes (step 105). In other words, crushing as used herein refers to a process of enlarging iron grains, the resultant enlarged material being in the form of iron flakes. A major portion of the resultant flakes are larger than 1.0 millimeter, typically in the range of 3.0 to 5.0 millimeters in size. At the same time that the mechanical working causes the fusion of the iron grains, the refractory oxide grains are ground to increasing fineness, typically less than 0.05 millimeters in size. The flake form of the metallic iron grains versus the cubic shape of the residual oxide grains is extremely important for physical separation.

The iron flakes are separated by size using any of a variety of well known separation techniques (step 107). For example, the crushed material may be passed through a separation screen, the screen separating the material into coarse or large flakes 109 and a mixture of fine flakes, refractory oxide grains, and unliberated refractory oxide-metal grains 110. The crushed material may also be separated using such techniques as air classification.

If the coarse grains 109 meet the requirements of the end user, for example the desired oxide levels, they may be sent directly to the final concentrate 111. If coarse grains 109 do not meet these requirements, they are flash ground for a period of time generally less than 30 minutes, and preferably less than 15 minutes (step 113). After grinding, the materials are separated using a magnetic separator to recover the metallic iron components and reject the non-magnetic oxide gangue (step 115). The rejected material is sent to the tailings 117.

The fine material 110 is ground for a longer period of time, preferably between 20 and 90 minutes (step 119). The amount of time required for this step is primarily based on the size of fine material 110 provided by separation step 107, the composition of the initial ore, and the requirements placed on the final product. After completion of grinding step 119, the material is magnetically separated into final concentrate 111 and tailings 117 (step 121).

The present invention is particularly beneficial in processing relatively high grade iron ores that are intimately associated with extremely fine-grained silica and alumina of feldspathic origin. Examples of such high grade ores include goethite, limonite, maghemite, and hematites. The iron content in these ores is commonly in the range of 60 to 65% while the residual oxide gangue contents are in the range of 6 to 9% with a relatively low phosphorus content of at most 0.05% (i.e., 0.11% $P_2O_5$). Due to the fine grain structure as well as the intimate associate of the iron ore with the oxide gangue, traditional concentration techniques are economically unfeasible as well as unable to achieve the desired oxide concentrations in the final product.

Preferably, prior to direct reduction, the mined iron ore is processed by one or more crushers. After the size of the mined ore has been reduced by the crushers, it is typically separated by size. Both the extent to which the mined ore must be reduced in size and the subsequent processing steps are dependent upon the intended type of direct reduction. Direct reduction systems as well as the requirements placed on the material to be processed are well known by those of skill in the art.

In a typical direct reduction system, the iron ore is placed within a kiln and reduced at a temperature below the melt temperature of the iron ore. Although various types of kilns may be used, typically shaft kilns are preferred over rotary kilns for the reduction of iron ore due to their high capacity. The kiln may use either a solid reducing agent such as coke, char, or anthracite coal, or a gaseous reducing agent such as hydrogen, carbon monoxide, or natural gas. The temperature of the kiln must be sufficiently high to heat the iron ore to a point where it is reduced to iron and is malleable during the subsequent crushing process. Although reduction temperatures as low as about 700° C. may be used, preferably the reduction temperature is at least 1000° C., and more preferably between 1050 and 1200° C.

During heating and calcination, the porosity of the earthy hematites is enhanced due to the release of water of hydration. The enhanced porosity of these materials in combination with their fine grain size leads to a high surface area for interaction with the reducing gases. Iron grain growth occurs, especially in the presence of hydrogen, if there are metallic grains in contact with active grain surfaces. As a consequence, metallization levels of 95 to 98% may be achieved by reducing such materials with hydrogen. Under the same reducing conditions, the other oxides of finely entrained grains of silica ($SiO_2$), alumina ($Al_2O_3$), apatite ($Ca_3(PO_4)_2$), lime (CaO), magnesia (MgO), and titania ($TiO_2$) are unreduced. However, generally during reduction there is relief of some grain boundary stresses associated with these non-iron oxides, leading to a lower fracture energy and an improved grindability. As a result, the unreduced oxides remain in the matrix of the metallic iron as discrete friable residual oxide grains.

In one type of direct reduction system appropriate for the relatively high grade iron ores of the present invention, hydrogen gas is used at high temperatures, preferably at temperatures of 900 to 1050° C. or greater. A benefit of hydrogen gas reduction is the minimization of the carburization of the iron during reduction, thereby avoiding the formation of iron carbide ($Fe_3C$). Iron carbide formation from solution in metallic iron initiates at 0.2% carbon content and martensite formation is a factor at contents as low as 0.5% carbon if the metallized reduced product is improperly quenched or cooled. Iron carbide is formed up to a saturation of 6.7% carbon and is nonmagnetic, hard, dense, and friable even with controlled cooling. As a result, the iron carbide does not lend itself to the subsequent physical processing and mechanical separation operations. Accordingly, carbon levels should be kept to a minimum regardless of the type of reduction system used. However, material with a carbon content exceeding 0.25% and up to a level of at least 1.5% may still be used with the present invention.

An additional benefit of hydrogen as a reducing gas is its high reactivity, leading to an increase in reduction rate and a higher degree of iron oxide metallization than achievable using carbon monoxide (CO) gas as the reducing gas. Maximizing metallization minimizes the formation of wustite (FeO) in the metallic iron grains, a material that is neither magnetic nor malleable. As a result of its properties, the wustite does not form flakes in accordance with the present invention, but instead reports with the residual oxides. Furthermore since it is nonmagnetic, it is not separable from the other oxides using magnetic separation. Therefore the inclusion of wustite leads to a loss of iron yield during separation and concentration.

In at least one embodiment of the invention, the iron ore fines are coated with fine limestone or lime powder to isolate the iron oxide particles. Limestone ($CaCO_3$) or lime (CaO) tends to form a thin inert layer on the surface of the iron oxide particle or preballed iron oxide fines. This inert layer helps to prevent granular fusion of the intermediate low melting temperature iron oxide phase (FeO) and concomitant clustering during reduction. The limestone/lime coating also prevents stickiness of the iron oxide fines at elevated temperatures, thereby allowing an increase in the processing temperature above the range of 900° to 1000° C.

Another aspect of at least one embodiment of the invention relates to preballing of the iron ore fines to minimize ultrafines in the feed to the fluid bed or hearth prior to reduction roasting. If there is an excess of ultrafine micron size material in the reduction feed, it can become gas borne and flash out of the roaster with insufficient contact time for a high degree of reduction. Preballing of the reduction roaster iron oxide feed with a water spray will adhere the fines particles to the surfaces of the coarser particles basically eliminating the slimes fraction in the reduction furnace feed. As a result, a more consistent and uniform metallization can be achieved. Preballing of earthy hematites works particularly well due to the slimes nature of the iron oxides, generally not even requiring a binder.

Even if hydrogen gas is used as the reductant in the reduction system, the output of the reduction furnace can be enhanced with the addition of fine carbon, typically in the form of pulverized coal or coke. The solid fuel (i.e., coal or coke) is pulverized to finer than 0.07 millimeters and is mixed with the iron oxide fines. If a preballing step such as that described above is included in the process, the pulverized solid fuel can be blended during this step. When the solid fuel in intimate contact with the iron oxide is heated, it acts as a powerful reductant, increasing the rate of oxygen removal. If the carbon in the solid fuel is applied at less than stoichiometric quantities, such that there is little, if any, carbon excess, there is no problem with carbon solution in the iron and iron carbide formation.

After the iron ore has undergone direct reduction, the resultant sponge iron is cooled under a controlled environment, preferably in a non-oxidizing atmosphere. The sponge iron is then crushed in such a way as to cause the malleable iron grains to fuse together to form large iron flakes. Although a variety of crushing techniques may be used in accordance with the invention, a common attribute of these techniques is that a relatively gradual pressing force is applied to the material rather than a rapid, impact type of force. A roll crusher is an example of a mechanism that applies a force in accordance with the present invention while the hammering action of a ball mill is an example of an impact force system.

During the crushing step of the present invention, metallic iron grains are liberated from the refractory oxide grains. As the crushing step continues, the malleable iron grains become fused together to form large, substantially flat flakes. Thus as opposed to reducing the size of the grains as is typical of a crushing operation, the iron grains are substantially enlarged through the fusion process. At the same time, the crushing step causes non-iron oxide bonds to be broken, both at grain boundaries and across grains. As a result, residual refractory particles are formed, typically with a grain size of less than 0.05 millimeters and generally less than 0.01 millimeters.

A substantial portion of the discrete iron flakes formed by the crushing step of the present invention are greater than 1.0 millimeter in size, and are typically in the range of about 3.0 to 5.0 millimeters. Thus the crushing step of the present invention leads to an increase in grain size by a factor of up to 500, assuming an initial grain size of 0.01 millimeters. Furthermore, as the iron grains are liberated from the refractory oxide grains, the density of the resultant iron grains is increased from about 4 to 5 grams per cubic centimeter to about 6 to 7 grams per cubic centimeter. As a result there is a major difference between the specific gravity of the metal flakes and the residual oxides.

In addition to the basic refractory oxides and soft metal grains passing through the crushing mechanism, there are also hybrids of refractory oxide-metal grains. In some instances these hybrid grains are simply due to the non-liberation of the iron grains from the refractory oxide grains, a condition that may be remedied through further crushing. In other instances the hybrid grains are metal grains that are embedded with refractory particles or, perhaps, metal grains smeared onto larger refractory particles. The two latter hybrids are undesirable as they lead to a lowering of iron yield. Therefore it is imperative that the refractory grains are flushed or elutriated by a fluid from the metal grains as rapidly as they are liberated thereby minimizing contamination through excessive contact of the refractory oxides and the metal grains during the crushing step.

In order to flush liberated refractory grains during the crushing step, in at least one embodiment of the invention the crushing mechanism includes a fluid. The fluid can be water, air, gas, or some other medium.

Figure 2:
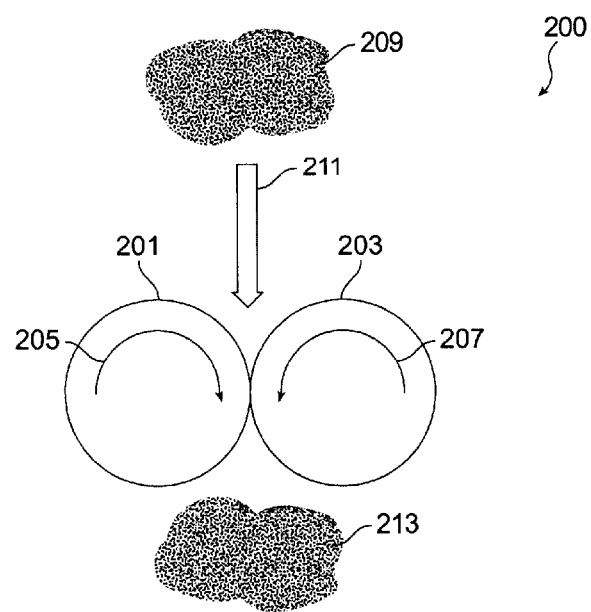
FIG. 2 is an illustration of the cross-section of a roll crusher used to fuse the iron particles in the present invention.

In the preferred embodiment of the invention, a roll crusher is used during the flake formation step. FIG. 2 is an illustration of the cross-section of a roll crusher 200. Roll crusher 200 is comprised to two rollers 201 and 203 rotating in opposite directions 205 and 207, respectively. Material 209 from the direct reduction system is fed along a direction 211. As the material passes between rollers 201 and 203, it is gradually pressed between the rollers and crushed. The output material 213 is comprised of fusion formed iron flakes, crushed non-iron oxides, and some hybrid material as described above. At this point output material 213 may be separated or run through roll crusher 200 one or more additional times. Alternatively, material 213 may be separated and only a portion of the material returned to crusher system 200 for additional pressing.

Although both rollers of roll crusher 200 may be rigidly mounted, preferably one or both rollers are spring rollers. In a rigid mounted system in which both rollers are rigidly coupled to a frame, if an uncrushable particle enters the rollers or if too much material enters the rollers at one time, the rollers will either stall or the crusher will experience some type of mechanical failure. These problems are alleviated with the spring roller system which allows the separation distance between the rollers to expand under these conditions.

In the preferred embodiment of the invention, rollers 201 and 203 have a diameter of 91.44 centimeters each. Other diameters may also be used with the present invention, the diameters being selected using well known formulas based on such factors as the size of particles 209, the nip angle, and the distance separating the rollers. For the preferred embodiment of the invention, the distance separating the rollers is nominally 0 (i.e., the roller surfaces are in contact). The principal factor in determining the length of rollers 201 and 203 is the desired throughput. Utilizing this embodiment of the invention, at least 20% of the iron flakes from crusher 200 are 1.0 millimeter or greater. Typically in this embodiment between 20% and 50% of the iron flakes are between 3.0 and 5.0 millimeters in size. The residual refractory particles passing through the crusher generally have a grain size of less than 0.05 millimeters and typically less than 0.01 millimeters.

Figure 3:
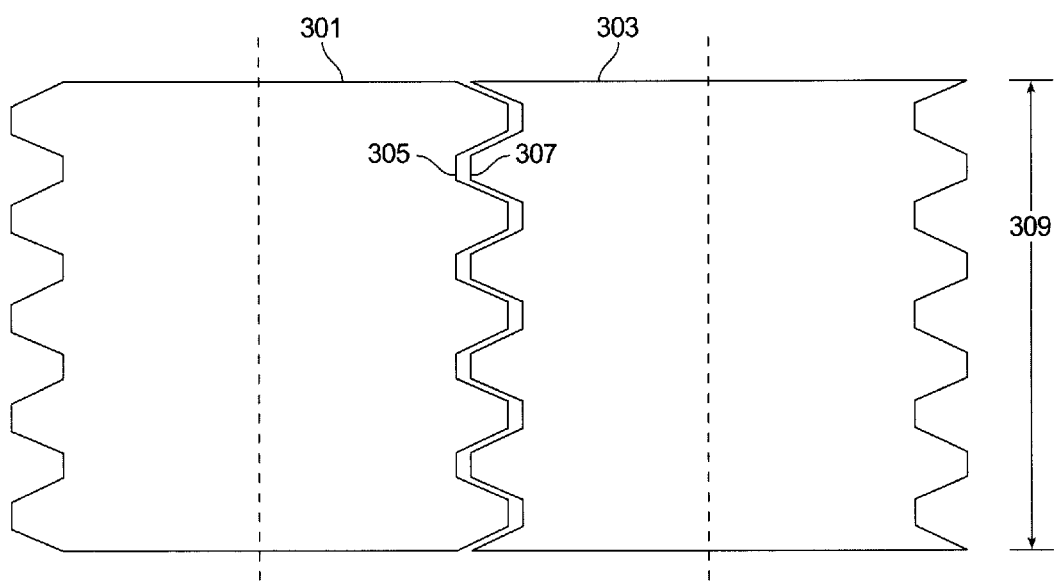
FIG. 3 is a cross-sectional view of the surfaces of a pair of corrugated rollers.

In an alternate embodiment of the invention, the surfaces of the rollers of roll crusher 200 have mating, corrugated surfaces. FIG. 3 is a cross-sectional view of the roller surfaces of this embodiment taken along the centerline of the rollers. Rollers 301 and 303 have corrugated surfaces 305 and 307, respectively. The benefit of the corrugated surfaces is an increase in the crushing surface of the rollers, thus providing higher material throughput than flat rollers of a similar length 309.

Figure 4:
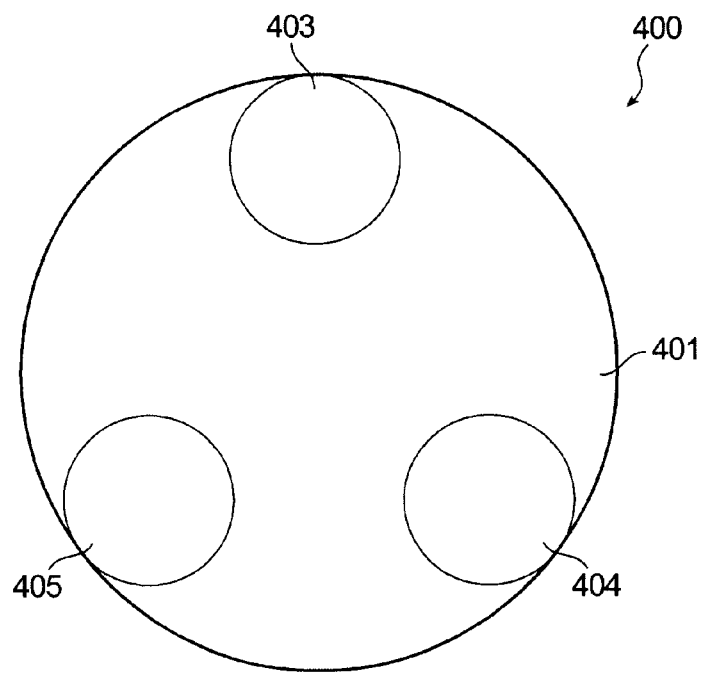
FIG. 4 is an illustration of a roller mill.

In an alternative embodiment of the invention, roll crusher 200 is replaced with a roller mill. A roller mill crushes material in a similar fashion to that of a roll crusher, gradually applying mechanical pressure to the material. There are a variety of types of roller mills well known by those of skill in the art. For example, a roller mill may be vertical or horizontal and the pressure forcing the roller surfaces together may be induced by gravity, springs, centrifugal force, or some combination thereof. Typically this type of mill includes one large metal ring within which one or more smaller metal rings roll. For example, a roller mill 400 is shown in FIG. 4. Mill 400 includes one large, metal, floating ring 401 against the inside surface of which are pressed three smaller rings 403–405. Typically only ring 403 is driven, causing floating ring 401 to rotate as well as small rings 404 and 405. Material is crushed as it passes between the inner surface of ring 401 and the outer surfaces of rings 403–405.

Figure 5:
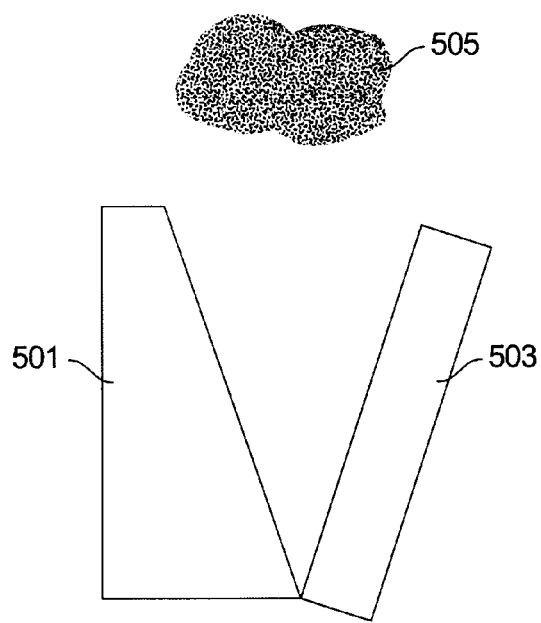
FIG. 5 is an illustration of the jaw members of a jaw crusher.

In an alternative embodiment of the invention, a jaw crusher is used to crush the material reduced in the direct reduction system. The jaw crusher utilizes two crushing surfaces, 501 and 503, as illustrated in FIG. 5. Surface 501 is fixed while surface 503 is movable. In use, jaw 503 alternately approaches and recedes from surface 501, crushing material 505 as it passes through the jaws. The surfaces of jaws 501 and 503 may be flat or one or both surfaces of the jaws may be corrugated or curved.

The present invention is not limited to the crushing mechanisms described above, rather other types of crushers may be used with similar results. However, the selected crusher must impart a gradually increasing pressure on the material rather than a rapid, impact type of pressure, resulting in a major portion of the iron flakes being greater than 1.0 millimeter in size, and preferably greater than 3.0 millimeters in size. Typically, the selected crusher is chosen on the basis of both performance and operating costs. For example, there are a variety of roller mills that impart sufficient, gradual pressure to the reduced material to crush the non-iron oxides while fusing the iron particles into large flakes. However, many of these roller mills are not suitable based on their operating costs.

After the reduced material has been sufficiently crushed to form large iron flakes, it is separated using conventional separation techniques. These techniques may be based on particle size, shape, or density. For example, in the preferred embodiment a 20 mesh screen (i.e., 0.813 millimeter aperture) is used to separate the material into coarse material and fine material. Other mesh sizes, for example screens with smaller apertures, may be used with the present invention. However, one advantage of the 20 mesh screen is that in many instances the large particles contain a sufficiently high percentage of iron and a sufficiently low percentage of non-iron oxides to be immediately used without undergoing further separation.

Besides screen separating, other techniques such as jigs, spirals, elutriation, cyclones, and gravity separators may be applied to the crushed material to separate the iron flakes from the fine residual oxide grains. In addition, the flat form of the metal flakes allows application of surfaces, such as spirals or cones, in the presence of fluids, for metal separation as the flake particles will cling to the flat surfaces while the cubic shaped refractory particles will be flushed away.

After the large flakes have been separated from the smaller flakes and the non-iron oxide particles, the large flakes are either sent directly to the final concentrate or undergo further oxide elimination. If further oxide elimination is required, the coarse material is first subjected to a flash grind, typically in the range of 5 to 30 minutes of grinding, and preferably in the range of 5 to 15 minutes. After grinding, the iron flakes are removed from the non-iron oxides, preferably using a magnetic separator. Similarly, in the preferred embodiment the fine material exiting the initial separation stage is first ground and then magnetically separated into final product and tailings. The grinding step for the fine material lasts between 20 and 90 minutes, and preferably less than 60 minutes. The magnetic separator uses a low intensity magnetic field to recover the metallic iron components and reject the non-magnetic oxide gangue.

Typically, once the material is properly separated into final concentrate and tailings, the tailings are sent to waste disposal while the concentrate is dried using conventional means. Preferably the drying operation takes place under controlled environmental conditions, thus avoiding oxidation of the iron particles.

After the concentrate has been suitably dried, it may be formed into briquettes using any of a variety of conventional techniques. In the preferred embodiment a fine mist of oil or lubricant is used to improve the packing density of the metal powder briquettes. The mist is applied after drying and before briquetting. The oil spray provides a lubricant at the powder surfaces, thus allowing the particles to slip on each other in the briquetting press, thereby improving briquette strength. The oil spray also minimizes the electrostatic charge on the metal particles acquired during drying. Since the electrostatic charge tends to reduce particle packing, minimization of the charge improves the achievable packing density.

EXAMPLES

The method of the present invention was evaluated on high grade iron ore from Marra Mamba of Western Australia. This ore contained 62% Fe, 3.7% $SiO_2$, 2.2% $Al_2O_3$, and 0.052% P. Due to the intimate association of the iron with extremely fine grained silica and alumina, separation and beneficiation of the iron grains using conventional techniques is impractical.

The ore was reduced at a temperature of 1025° C. for 1.5 hours using 40% PUC coal. Chemical analyses of the direct reduced material prior to crushing and separation, averaged over six samples, yield a metallization of 91.19% with 78.24% iron, 8.18% $SiO_2$, 2.992% $Al_2O_3$, 0.041% P, and 5.81% C.

After direct reduction, the material was roll crushed using a spring tensioned, 30 centimeter diameter roll crusher. The crushed material was separated with a 20 mesh screen. In the following sample, the material passing through the screen (i.e., <20 mesh) was subjected to a 90 minute grind while the material that did not pass through the screen (i.e., >20 mesh) was subjected to a 15 minute grind. Chemical analysis of the results yields:

| Description | Wt Rec (%) | Wt Rec$_{Fe}$ (%) | Fe$_{tot}$ (%) | $SiO_2$ (%) | $Al_2O_3$ (%) | P (%) |
|---|---|---|---|---|---|---|
| Conc | 85.23 | 95.48 | 93.31 | 2.21 | 1.146 | 0.019 |
| Tail | 14.77 | 3.77 | 25.51 | 32.49 | 13.644 | 0.166 |
| Head | 100.00 | 100.00 | 83.30 | 6.68 | 2.992 | 0.041 |

Thus the iron content was increased from 83.30% to 93.31% at a 95.5% iron recovery. Silica and alumina oxides were reduced from 9.67% to 3.36% while the phosphorus concentration was halved from 0.041% to 0.019%.

As will be understood by those familiar with the art, the present invention may be embodied in other specific forms without departing from the spirit or essential characteristics thereof. For example, a variety of different separation techniques may be used. Furthermore, the invention is not restricted to a single method of direct reduction nor is it restricted to a single method of crushing the reduced materials. Accordingly, the disclosures and descriptions herein are intended to be illustrative, but not limiting, of the scope of the invention which is set forth in the following claims.

What is claimed is:

1. A method for obtaining an iron concentrate from a charge of iron ore, the method comprising the steps of:
   reducing said charge of iron ore with a direct reduction process to obtain a reduced iron material;
   crushing said reduced iron material to form a plurality of iron flakes and a plurality of refractory particles, wherein a substantial portion of said plurality of iron flakes are greater than 1.0 millimeter in size and wherein a substantial portion of said plurality of refractory particles are smaller than 0.05 millimeters in size; and
   separating said crushed material to obtain said iron concentrate.

2. The method of claim 1, wherein said direct reduction process operates at a temperature of at least 700° C.

3. The method of claim 1, wherein said direct reduction process operates at a temperature of at least 1000° C.

4. The method of claim 3, wherein said temperature is between about 1050° C. and 1200° C.

5. The method of claim 1, wherein said direct reduction process uses at least one gaseous reductant.

6. The method of claim 5, wherein said at least one gaseous reductant is hydrogen.

7. The method of claim 5, wherein said at least one gaseous reductant is a mixture of hydrogen and carbon monoxide.

8. The method of claim 1, wherein said direct reduction process uses a solid reducing agent.

9. The method of claim 8, wherein said solid reducing agent is selected from the group consisting of coke, char, and anthracite coal.

10. The method of claim 1, further comprising the step of coating said charge of iron with a calcium containing material prior to said reducing step, wherein said calcium containing material is selected from the group consisting of limestone and lime.

11. The method of claim 1, further comprising the step of preballing said charge of iron prior to said reducing step.

12. The method of claim 11, further comprising the step of blending pulverized solid fuel to said preballed charge of iron.

13. The method of claim 12, wherein said pulverized solid fuel is selected from the group consisting of coal or coke.

14. The method of claim 13, wherein said pulverized solid fuel is pulverized to finer than 0.070 millimeters in size.

15. The method of claim 12, wherein said blending step occurs prior to said preballing step.

16. The method of claim 1, further comprising the step of cooling said reduced iron material in a non-oxidizing atmosphere prior to said crushing step.

17. The method of claim 1, wherein said substantial portion of said plurality of iron flakes is at least 20% of said plurality of iron flakes.

18. The method of claim 1, wherein at least 20% of said plurality of iron flakes are greater than 3.0 millimeters in size.

19. The method of claim 1, wherein said crushing step utilizes a roll crusher.

20. The method of claim 19, wherein said roll crusher further comprises a pair of rollers, each of said rollers having a corrugated surface.

21. The method of claim 1, wherein said crushing step utilizes a roller mill.

22. The method of claim 1, wherein said crushing step utilizes a jaw crusher.

23. The method of claim 1, said separating step further comprising the steps of:
   screening said crushed material into a coarse material and a fine material;
   grinding said fine material; and
   magnetically separating iron concentrates from said coarse material and said fine material.

24. The method of claim 23, further comprising the step of grinding said coarse material.

25. The method of claim 23, wherein said grinding step lasts for a period of time between about 20 minutes and about 90 minutes.

26. The method of claim 24, wherein said grinding step for said coarse material lasts for a period of time between about 5 minutes and about 30 minutes.

27. The method of claim 23, wherein said screening step uses a 20 mesh screen.

28. The method of claim 1, further comprising the step of briquetting said iron concentrate.

29. The method of claim 28, further comprising the steps of drying said iron concentrate and spraying said dried concentrate with an oil spray prior to said briquetting step.

30. The method of claim 1, wherein said iron concentrate contains greater than 92% iron and less than 5% silica and alumina oxides.

31. The method of claim 1, wherein said iron concentrate contains greater than 95% iron and less than 2% silica and alumina oxides.

32. A method for obtaining an iron concentrate from a charge of iron ore, the method comprising the steps of:

reducing said charge of iron ore with a direct reduction process to obtain a reduced metallic iron material;

crushing said reduced metallic iron material with a roll crusher to form a plurality of iron flakes and a plurality of refractory particles, wherein a substantial portion of said plurality of iron flakes are greater than 1.0 millimeter in size and wherein a substantial portion of said plurality of refractory particles are smaller than 0.05 millimeters in size;

separating said crushed material into a coarse material and a fine material;

grinding said fine material;

separating said iron concentrate from said coarse material and said ground fine material.

33. The method of claim 32, further comprising the step of grinding said coarse material, wherein said coarse grinding step is prior to said iron concentrate separating step.

34. A method for obtaining an iron concentrate from a charge of iron ore, the method comprising the steps of:

reducing said charge of iron ore with a direct reduction process to obtain a reduced metallic iron material, wherein said direct reduction process uses at least one gaseous reductant, wherein said at least one gaseous reductant includes a hydrogen gas;

crushing said reduced metallic iron material with a roll crusher to form a plurality of iron flakes and a plurality of refractory particles, wherein at least 20% of said plurality of iron flakes are greater than 3.0 millimeters in size;

screening said crushed material into a coarse material and a fine material;

grinding said fine material; and separating said iron concentrate from said coarse material and said ground fine material, wherein said iron concentrate contains greater than 95% iron and less than 2% silica and alumina oxides.

35. The method of claim 34, wherein a substantial portion of said plurality of iron flakes are greater than 1.0 millimeter in size.

36. The method of claim 35, wherein a substantial portion of said plurality of refractory particles are smaller than 0.05 millimeter in size.

37. The method of claim 34, wherein a substantial portion of said plurality of refractory particles are smaller than 0.05 millimeter in size.

* * * * *